July 5, 1927.

L. V. ARONSON 1,634,251

ORNAMENT

Filed Sept. 18, 1924

Inventor

Louis V. Aronson

By Brower & Phelps

Attorneys

Patented July 5, 1927.

1,634,251

UNITED STATES PATENT OFFICE.

LOUIS V. ARONSON, OF NEWARK, NEW JERSEY.

ORNAMENT.

Application filed September 18, 1924. Serial No. 738,397.

The invention relates to ornaments, and has as an object the provision of an ornament for a smooth surface, such as automobile wind-shields.

An object of the invention is the provision of an ornament, preferably in bas relief, so secured to the smooth surface of glass that it will remain in place even when subjected to the vibration incident to its use upon a wind-shield.

A further object of the invention is the provision of an ornament so applied to a wind-shield that its outline may be observed from the rear thereof.

Further objects of the invention will appear from the following description when read in connection with the accompanying drawings, in which—

As shown, the device comprises a fraternal organization emblem 10, secured by a suitable adhesive to the surface of the glass of a wind-shield.

In the form shown in Figs. 1 to 4 inclusive, the ornament is in the form of an embossed sheet of material in which the details of the emblem appear upon the reverse side in depressed form.

Figure 1:
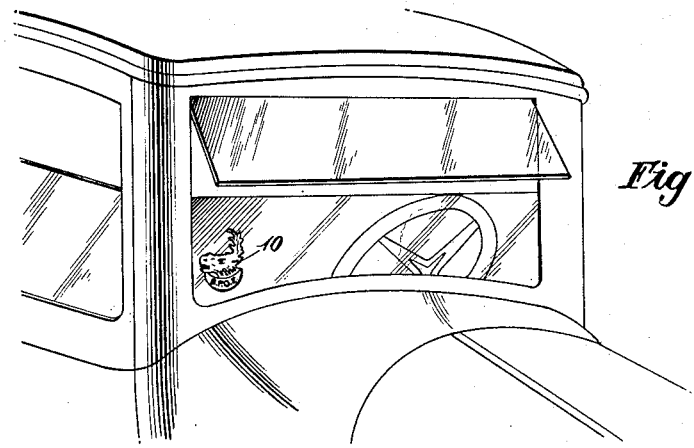
Fig. 1 is a perspective view of a portion of an automobile having an ornament applied according to the invention.
Figure 2:
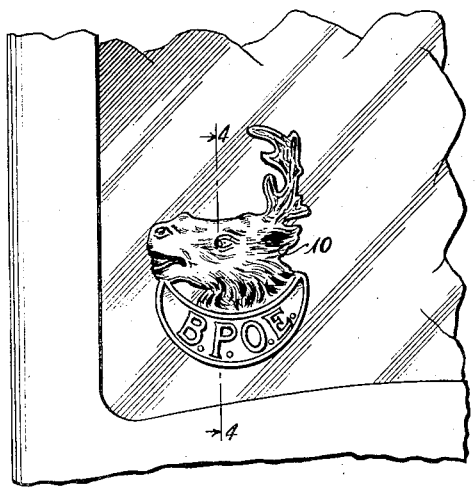
Fig. 2 is a detail elevation of an ornament in place.
Figure 3:
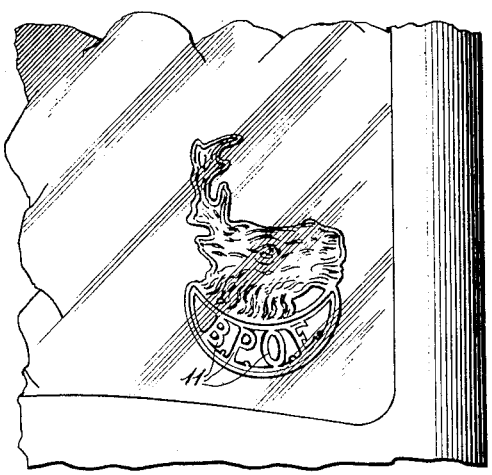
Fig. 3 is a rear view of the structure shown in Fig. 2.

In this form of the invention to secure the emblem to the glass the rear surface of the same is covered with a suitable adhesive, such as an amylacetate adhesive gum which does not result in the obscuring of the details shown in depressed form upon the rear, and the thus prepared emblem is pressed against the glass to firmly secure the same thereon. The appearance of the thus secured emblem from the rear is shown in Fig. 3, and the form thereof, as well as the details of the letters 11, are plainly discernible.

Figures 4, 5:
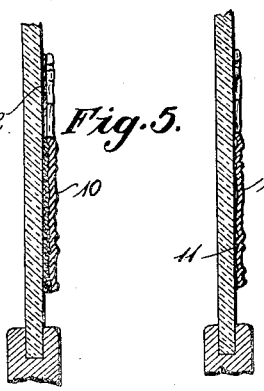
Fig. 4 is a vertical section on line 4, 4 of Fig. 2.
Fig. 5 is a section corresponding to Fig. 4, showing a modified form of the invention.

When it is not a requirement that the details of the emblem may be seen from the rear a more firm adhesion may be secured by the form of the invention shown in Fig. 5, wherein a piece of felt or the like is first secured to the rear of the emblem. This may be accomplished by a gum, such as already referred to, and the felt is formed with its outline in registry with the outline of the emblem to be utilized. The felt or the like 12 is impregnated with the adhesive when the device is to be applied to the glass and is pressed thereagainst. By this means the depressions in the rear of the emblem are filled and the entire surface represented by the rear of the emblem is utilized for adhesion to the glass.

A variety of emblems may be kept by a dealer ready to be applied to a wind-shield, and may be very readily applied when wanted by the customer.

Minor changes may be made in the physical embodiment of the invention without departing from its spirit.

I claim:

1. A wind-shield ornament comprising, in combination, an ornamental object in bas relief, a backing of resilient material adhesively secured thereto, the thus provided unit adapted to be secured to a wind-shield by a suitable adhesive.

2. A wind-shield ornament comprising, in combination, an ornamental object in bas relief, a backing of felt secured thereto by a suitable adhesive, the unit adapted to be secured to a wind-shield by a suitable adhesive.

LOUIS V. ARONSON.